C. C. SPENGLER.
BINDING CLIP.
APPLICATION FILED APR. 21, 1913.
1,150,073.
Patented Aug. 17, 1915.
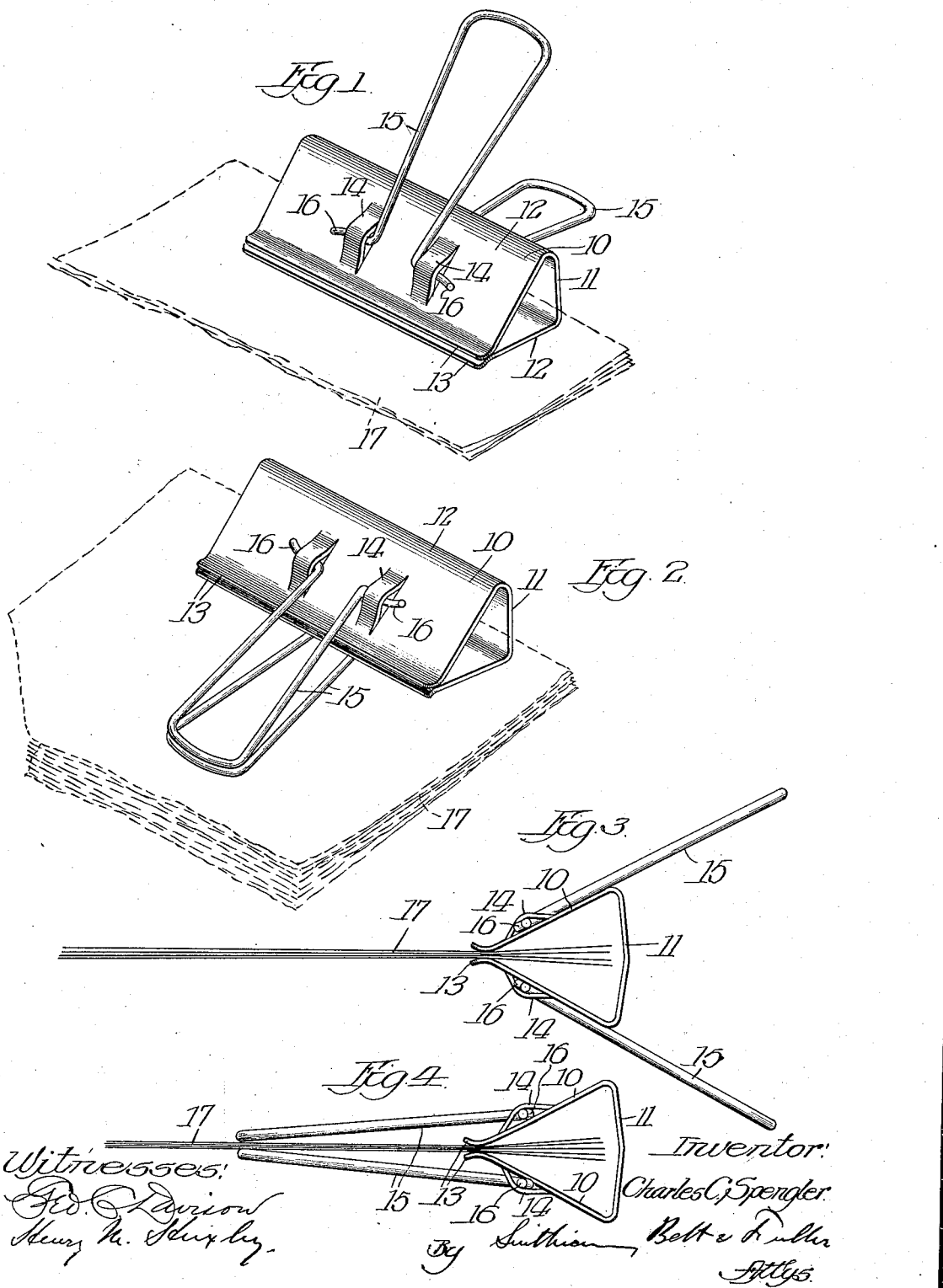

UNITED STATES PATENT OFFICE.

CHARLES C. SPENGLER, OF ROCKFORD, ILLINOIS, ASSIGNOR TO SPENGLER BROTHERS COMPANY, OF CHICAGO, ILLINOIS, A CORPORATION OF ILLINOIS.

BINDING-CLIP.

1,150,073.

Specification of Letters Patent.

Patented Aug. 17, 1915.

Application filed April 21, 1913. Serial No. 762,467.

*To all whom it may concern:*

Be it known that I, CHARLES C. SPENGLER, a citizen of the United States, residing at Rockford, in the county of Winnebago, State of Illinois, have invented certain new and useful Improvements in Binding-Clips, of which the following is a specification.

My invention relates to binding clips, and refers particularly to clips which are used in fastening together a series of papers.

I am aware that heretofore binder clips have been made having lever handles which may be used in either of two positions: first, in the clip-opening position, in which the handles project beyond the back of the clip, and, second, in the paper-retaining position, in which the handles project forward from the clip and aid in clamping the papers.

It is the object of my invention to so attach the lever handles to the clip that they will be forced into either one of the above-mentioned positions by a strong spring pressure. I have found this result can be best accomplished by retaining the bent ends of the lever handles in retainer straps preferably made integral with the body of the clip and located about midway between the back and front edges of the same. These and other objects of my invention will be more readily understood by reference to the accompanying drawings, in which—

Figure 1 is a perspective of my improved binding clip, the lever handles being shown in the position in which they are adapted to open the clip; Fig. 2 is a perspective similar to Fig. 1, except that the lever handles are shown in alternate position; Fig. 3 is an end elevation of the clip and the papers secured thereby, the lever handles being shown in the same relative position as in Fig. 1; and Fig. 4 is an end elevation similar to Fig. 3, the lever handles being shown in the same relative position as in Fig. 2.

The binding clip which constitutes the subject-matter of my invention comprises a body portion 10, which, in turn, consists of the back 11 and the two side members 12, 12, the back and the side members together being of triangular shape in end elevation. The edges 13 of the side members 12 are slightly bent outwardly in order that papers or the like may be more readily introduced between the side members 12, as will be explained hereafter, while at the same time the bent edges constitute a more satisfactory bearing surface. Each of the side members 12 is provided with a pair of retaining straps 14, 14, which are punched from the metal constituting the side member. A lever handle 15 is provided in connection with each of the side members 12. This lever handle is roughly of a U shape and is preferably made of wire. The ends 16 of each lever handle 15 are turned outwardly and pass beneath the retainer straps 14, 14. The ends 16 form with the main axis of the lever handle an angle slightly greater than 90°, whereby when the lever handles are in the position indicated in Figs. 1 and 3 these handles are positively kept in contact with the side members 12, while, on the other hand, if the lever handles are turned into the positions indicated in Figs. 2 and 4 the configuration of the ends 16 causes each of the lever handles to be forced toward the other by spring pressure.

Having thus described the construction of the various parts which are used in my invention, the operation of the same may now be readily understood: When it is desired to fasten together a stack of papers, such as 17, by means of my improved binding clip, the lever handles 15 are moved into the position shown in Figs. 1 and 3. The handles are then pressed toward each other, thereby separating the side members 12, 12 from each other. The papers 17 may now be placed into position. In order to more readily retain the papers and at the same time in order to move the handles 15 out of the way the lever handles 15 are turned into the position shown in Figs. 2 and 3, thereby forming additional engagement with the papers 17.

It will be apparent that considerable change may be made in the detailed construction of the clip which I have described without departing from the spirit or scope of my invention.

What I claim is:

1. A binder clip comprising a substantially U-shaped body, bearings on the outer faces of the sides of the body between the front and rear edges thereof, and a lever handle for each side of the body, each handle having a terminal pivot member disposed at an obtuse angle with the handle and pivotally mounted in one of the bearings, said handles capable of being swung rearwardly from an intermediate position into positions for use as levers for separating the free ends of the body, and also capable of being swung forwardly into positions projecting in front of the free ends of the body, the pivots of the handles having a cam relation with the bearings and the respective sides of the body such as to maintain the handles in their extreme positions, substantially as described.

2. A binder clip comprising a body having a back and side members, each of said side members having a pair of retaining straps integral therewith, and a substantially U-shaped lever handle for each of said side members, the ends of each of said lever handles forming obtuse angles with the main axis of the handle and passing between said retainer straps and said side member and having a cam relation with the straps and the respective sides of the body such as to maintain the handles in their extreme positions, substantially as described.

3. A binder clip comprising a body having a back and side members, each of said side members having a pair of retaining straps integral therewith and remote from the front edge thereof, and a substantially U-shaped lever handle for each of said side members, said handles capable of being swung rearwardly from an intermediate position into positions for use as levers for separating the free ends of the body, and also capable of being swung forwardly into positions projecting in front of the free ends of the body, the ends of each of said lever handles forming obtuse angles with the main axis of the handle and passing through said retaining straps, and having a cam relation with the straps and the respective sides of the body, such as to maintain the handles in their extreme positions.

CHARLES C. SPENGLER.

Witnesses:
HELEN V. PETERS,
EDMUND H. RUH.

Copies of this patent may be obtained for five cents each, by addressing the "Commissioner of Patents, Washington, D. C."